United States Patent
Bar Yanai et al.

(10) Patent No.: US 11,546,264 B2
(45) Date of Patent: Jan. 3, 2023

(54) EFFICIENT EVALUATION OF SESSION ACTIVITY

(71) Applicant: MELLANOX TECHNOLOGIES TLV LTD., Raanana (IL)

(72) Inventors: Roni Bar Yanai, Even Yehuda (IL); Eliezer Britstein, Beerotaim (IL); Guy Twaig, Bet Hilel (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/204,982

(22) Filed: Mar. 18, 2021

(65) Prior Publication Data
US 2022/0303222 A1    Sep. 22, 2022

(51) Int. Cl.
*H04L 47/2408*  (2022.01)
*H04L 47/26*    (2022.01)
*H04L 47/34*    (2022.01)
*H04L 47/2441*  (2022.01)

(52) U.S. Cl.
CPC ...... *H04L 47/2408* (2013.01); *H04L 47/2441* (2013.01); *H04L 47/26* (2013.01); *H04L 47/34* (2013.01)

(58) Field of Classification Search
CPC ............. H04L 47/2408; H04L 47/2441; H04L 47/26; H04L 47/34
See application file for complete search history.

(56) References Cited

U.S. PATENT DOCUMENTS

| | | | |
|---|---|---|---|
| 7,706,357 B1* | 4/2010 | Dyckerhoff | H04L 45/60 370/468 |
| 7,929,443 B1* | 4/2011 | Anumala | H04L 47/724 709/228 |
| 8,599,858 B1 | 12/2013 | Mizrahi | |
| 11,075,847 B1* | 7/2021 | Kwan | H04L 47/283 |
| 2009/0046581 A1* | 2/2009 | Eswaran | H04L 43/0876 370/230 |
| 2020/0092214 A1 | 3/2020 | Everhart et al. | |
| 2021/0152474 A1* | 5/2021 | Shpigelman | H04L 69/22 |

OTHER PUBLICATIONS

Westphal, "Improvements to Conntrack Table Overflow Handling," Netdev 2.1—The Technical Conference on Linux Networking, pp. 1-4, Apr. 2017.
Kim et al., "A Dynamic Timeout Control Algorithm in Software Defined Networks," International Journal of Future Computer and Communication, vol. 3, No. 5, pp. 331-336, Oct. 2014.

* cited by examiner

*Primary Examiner* — Khaled M Kassim
*Assistant Examiner* — Najeeb Ansari
(74) *Attorney, Agent, or Firm* — Kligler & Associates Patent Attorneys Ltd

(57) ABSTRACT

A network device includes one or more communication ports, a packet processing circuit and an activity evaluation circuit. The one or more communication ports are configured to communicate packets over a network. The packet processing circuit is configured to process the packets. The activity evaluation circuit is configured to generate a sequence of multiple evaluation times independently of the packets, and, for each evaluation time among at least some of the evaluation times in the sequence, for any packet that is processed by the packet processing circuit at the evaluation time, to identify a session to which the packet belongs and issue an increment event associated with the identified session.

13 Claims, 2 Drawing Sheets

EFFICIENT EVALUATION OF SESSION ACTIVITY

FIELD OF THE INVENTION

The present invention relates generally to data communication, and particularly to methods and systems for efficiently evaluating activity of communication sessions in network connected devices.

BACKGROUND

Network connected devices such as Network Interface Controllers (NICs), Host Channel Adapters (HCAs), network-enabled graphic processors, switches, gateways and routers, typically allocate a limited amount of hardware and software resources (e.g., memory) to process network traffic in a plurality of communication sessions and may deallocate resources from aging sessions having decreased activity.

In "Dynamic Timeout Control Algorithm for Software Defined Networks," Kim et al., International Journal of Future Computer and Communication, Vol. 3, No. 5, October, 2014, the authors address the scalability problem of Software Defined Networks (SDNs), and propose to improve the scalability of the SDN controller by dynamically controlling the timeout value of each flow (e.g., session), after which resources are deallocated.

In "Improvements to Conntrack Table Overflow Handling," Westphal, Netdev 2.1—The Technical Conference on Linux Networking, April, 2017, the author gives a high-level overview of the Linux Connection-Tracking (Conntrack) system, and describes how connections are evicted from the connection table, after a timeout period with no activity.

SUMMARY

An embodiment of the present invention that is described herein provides a network device including one or more communication ports, a packet processing circuit and an activity evaluation circuit. The one or more communication ports are configured to communicate packets over a network. The packet processing circuit is configured to process the packets. The activity evaluation circuit is configured to generate a sequence of multiple evaluation times independently of the packets, and, for each evaluation time among at least some of the evaluation times in the sequence, for any packet that is processed by the packet processing circuit at the evaluation time, to identify a session to which the packet belongs and issue an increment event associated with the identified session.

In some embodiments, the sequence of evaluation times includes a random sequence. In some embodiments, the activity evaluation circuit is configured to estimate respective activity levels of multiple sessions in response to increment events generated for the sequence of evaluation times, and to allocate resources of the packet processing circuit to the sessions depending on the estimated activity levels.

In an embodiment, the activity evaluation circuit is configured to issue the increment event by incrementing a count associated with the identified session. In another embodiment the activity evaluation circuit is configured to issue the increment event by indicating the identified session to a processor. In a disclosed embodiment, the activity evaluation circuit is configured to check for packets during a specified time duration following each evaluation time in the sequence.

There is additionally provided, in accordance with an embodiment of the present invention, a method including, in a network device, processing packets using a packet processing circuit and communicating the packets over a network using one or more communication ports. A sequence of multiple evaluation times is generated independently of the packets. For each evaluation time among at least some of the evaluation times in the sequence, for any packet that is processed by the packet processing circuit at the evaluation time, a session to which the packet belongs is identified, and an increment event associated with the identified session is issued.

There is also provided, in accordance with an embodiment of the present invention, a method for approximate evaluation of session activity levels. The method includes, in a network device, transmitting and receiving packets belonging to one or more communication sessions. A sequence of multiple evaluation times is generated. For each evaluation time among at least some of the evaluation times in the sequence, for any packet that is found to be processed at the evaluation time, a session to which the packet belongs is identified, and a count associated with the identified session is incremented.

The present invention will be more fully understood from the following detailed description of the embodiments thereof, taken together with the drawings in which:

DETAILED DESCRIPTION OF EMBODIMENTS

Overview

Figure 1:
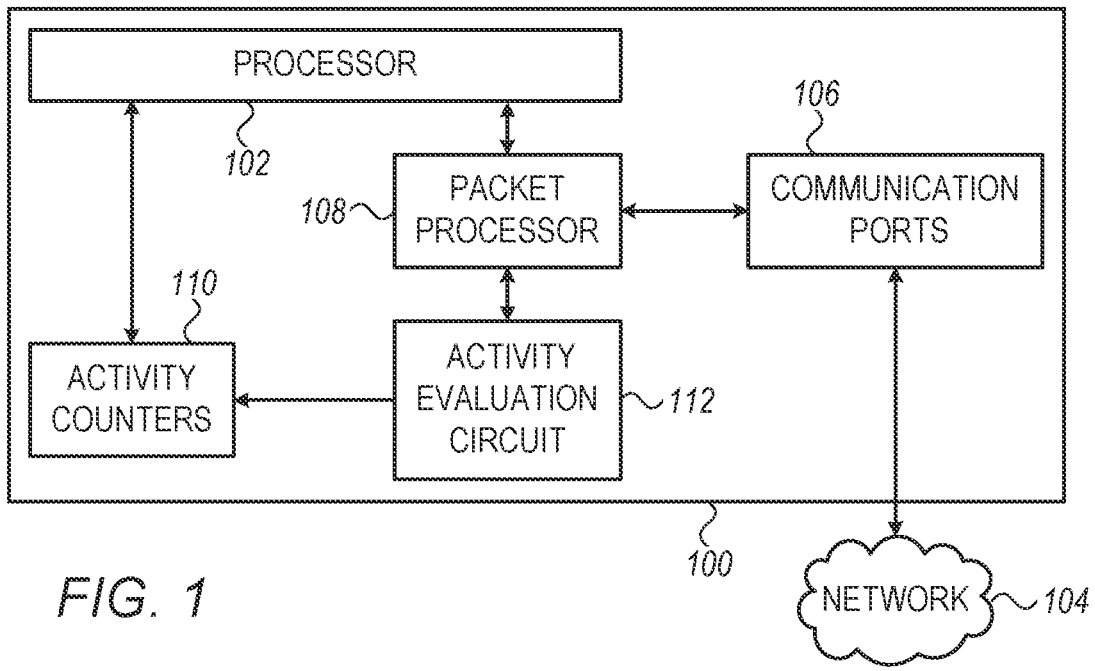
FIG. 1 is a block diagram that schematically illustrates the structure of a Network Interface Controller (NIC) employing approximate activity counting, in accordance with an embodiment of the present invention.

In communication networks, network connected devices such as Network Interface Controllers (NICs), Host Channel Adapters (HCAs), network-enabled graphic processors, switches, gateways and routers, allocate and deallocate resources to process packets in one or more communication sessions.

In the present context, the term "session" refers to a unidirectional or bidirectional exchange of packets over one or more packet flows. The packets of each flow are typically identified by a combination of packet-header values ("tuple"). Some sessions may comprise a single flow. Other sessions may comprise multiple flows, in the same direction or in opposite directions.

A network device may assess the level of activity in the various sessions to identify aging sessions that are not active (e.g., do not transfer data) for a relatively long period. When such an assessment is done by counting on a per-packet basis, the added overhead may be large, decreasing the overall network device performance.

Embodiments of the present invention that are disclosed herein provide for apparatuses and methods that employ statistical activity counting, in which the count frequency is typically much lower than one count per packet. The resulting activity estimation is approximate, and thus less accurate than counting on a packet-by-packet basis. For the purpose of resource allocation and deallocation, however, the activity assessment does not have to be packet-level accurate, and can be replaced by activity estimates, thereby improving performance and saving power.

In some embodiments, a network device comprises a set of counters that count the level of activity in a plurality of communication sessions, and an activity evaluation circuit, which is configured to generate a sequence of count events at time periods that are independent of the network communication. In an embodiment, the count events may be randomly generated; in another embodiment, a pseudo-random event generator (e.g., a Feedback Shift Register (FSR)) generates the count events. When a count event is generated, the activity counters corresponding to the currently active sessions are incremented. In some embodiments, the currently active session or sessions are determined according to the packets that are being communicated over the network at the time of the count event.

In other embodiments, the activity evaluation circuit, when generating a count event, indicates to a processor of the network device which session or sessions are currently active, and the processor may use the indication to determine the activity levels of the communication sessions, allocating and deallocating resources accordingly.

More details will be disclosed in the System Description hereinbelow, with reference to example embodiments.

System Description

In the descriptions hereinbelow we will refer mainly to Network Interface Controllers (NICs); the disclosed techniques, however, are not limited to NICs, and may be used in various other network connected devices, including but not limited to Host Channel Adapters (HCAs), Data Processing Units (DPUs, also referred to as "Smart NICs"), network-enabled graphic processing units (GPUs), switches, gateways and routers.

Network Interface Controllers and other network devices typically manage communication over a communication network (e.g., Ethernet, or InfiniBand™) in a one or more sessions, possibly concurrently. The sessions may comprise various packet flows, each characterized by a different header 5-tuple, which specifies source and destination addresses and ports, as well as the communication protocol to be used. (In some embodiments, the session may be characterized by a tunnel-ID, and in other embodiments by any other suitable header field or combination of fields). To manage a communication session, the NIC may need to allocate resources (e.g., memory) for each session. When a session "ages" and its activity diminishes, the NIC may reallocate resources from the aged session to currently active sessions.

To facilitate such aging-based allocation, a NIC may keep track of the activity in each of the concurrently active sessions. For example, when communicating (transmitting or receiving) a packet that is associated with a session, the NIC may increment a respective session activity counter; the activity counters may be decremented periodically; thus, the count of active session will grow, whereas the count of idle sessions will decrease. However, incrementing a counter on every packet is highly non-scalable and may degrade the NIC performance considerably.

Embodiments according to the present invention utilize approximate ("fuzzy") activity counting, wherein the session activity counters are incremented sparsely, reducing processing load and increasing performance.

FIG. 1 is a block diagram that schematically illustrates the structure of a NIC 100 with approximate activity counting, in accordance with an embodiment of the present invention. NIC 100 comprises a processor 102, which is configured to communicate packets over a communication network 104 (e.g., Ethernet or InfiniBand™), in a plurality of communication sessions, wherein a session may comprise one or more unidirectional or bidirectional packet-flows.

The NIC further comprises one or more communication ports 106, which are configured to receive and send communication packets over network 104, and a packet processor 108, which is configured to process the packets. In embodiments, processor 102 is configured to allocate and deallocate resources such as memory buffers to the various communication sessions, including the deallocating of resources allocated to communication sessions that are no longer active.

For the sake of simplicity, the term "resources" (in the context of the present embodiment and of further embodiments to be disclosed hereinbelow) will refer to memory segments within the processor that are allocated to buffer ingress and egress packets. Such resources may be directly allocated and deallocated by the processor. In some embodiments, the memory may be external to the processor (e.g., coupled to the NIC through a system bus), in which case the processor controls the allocation of resources indirectly, e.g., by sending allocation and deallocation commands to the packet processor; in other embodiments, the term "resources" may apply to other types of circuits, e.g., counters and encryption/decryption circuits.

To efficiently allocate a limited resource (e.g., memory space), NIC 100 comprises Activity Counters 110 and an Activity Evaluation Circuit 112. In some embodiments, the activity counters may comprise a plurality of registers that share a common increment circuitry; in other embodiments each of the plurality of counters comprises an increment circuit.

The Activity Evaluation Circuit 112 is configured to generate count events at a sequence of evaluation times that is independent of the packet processing. Responsively to a count event, the Activity Counters increment one or more of the plurality of counters, which correspond to one or more sessions that are currently active at the time of the count event (and, in some embodiments, for a preset time period following the count event). The act of incrementing a counter is also referred to as issuing an "increment event."

For example, if the Activity Evaluation Circuit generates a count event and, at the same time, the packet processor is processing a packet that pertains to a given communication session, a counter among activity counters 110, corresponding to the given session, will increment. In some embodiments the packets that the packet processor processes at the time of the count event are determined according to the packets that the ports 106 are communicating (typically taking into account packets that are related to the flows and sessions of interest and ignoring irrelevant packets); in other embodiments, the session is determined by activity indicators within packet processor 106. In an embodiment, if no packet is being communicated at the time of the count event, no activity counter will increment; in another embodiment, the activity counter pertaining to the last communicated packet at the time of the count event will increment.

In some embodiments, the activity evaluation circuit is configured to generate the sequence of evaluation times (count events) at random time intervals; in embodiments the expectancy and/or the variance of the time intervals are preset parameters; in other embodiments the activity evaluation circuit generates a pseudo-random sequence of evaluation times using, for example, a feedback-shift-register (FSR).

In embodiments, the frequency of the count events is significantly less than one per packet. This may result in less accurate counting; however, the sparse counting significantly reduces the counting overhead and, thus, may increase the NIC performance.

In some embodiments, activity counters 110 are configured to decrement the activity counts periodically (e.g., once per preset period); thus, when a session ceases to be active, the corresponding count will gradually decrease. In other embodiments, the counters will not decrease but will rather stop increasing; the processor, in this case, will compare consecutive reading of the counter to obtain a measure of the session activity.

As would be appreciated, the structure of NIC 100, illustrated in FIG. 1 and described hereinabove is cited by way of example. In alternative embodiments various suitable structures may be used. For example, in some embodiments, processor 102 controls the allocation and deallocation of resources in packet processor 108; in other embodiments, the resources may be in a memory or in memories that are not within processor 102, e.g., in a RAM that is coupled to the NIC by a system bus; in yet other embodiments, the resources are not limited to memory an may comprise other circuits, e.g., counters, encryption/decryption circuits and others.

In some embodiments, activity counters 110 directly count aging. When a new session starts (e.g., the first packet pertaining to the session is communicated), a corresponding session counter is preset (e.g., by processor 102) to a time-expiration value; the counter is then decremented periodically (e.g., if the units of the preset time-expiration value are micro-seconds, the counter may decrement every microsecond); when the activity evaluation circuit indicates a count event corresponding to the session, the counter resets to the expiration value. Thus, the activity counter will reach zero if no activity is detected during a period that is equal to the preset expiration value. In other embodiments the counter does not decrease but rather stops increasing, and the processor obtains a measure of the session activity by comparing the counter value to the last read value.

Figure 2:
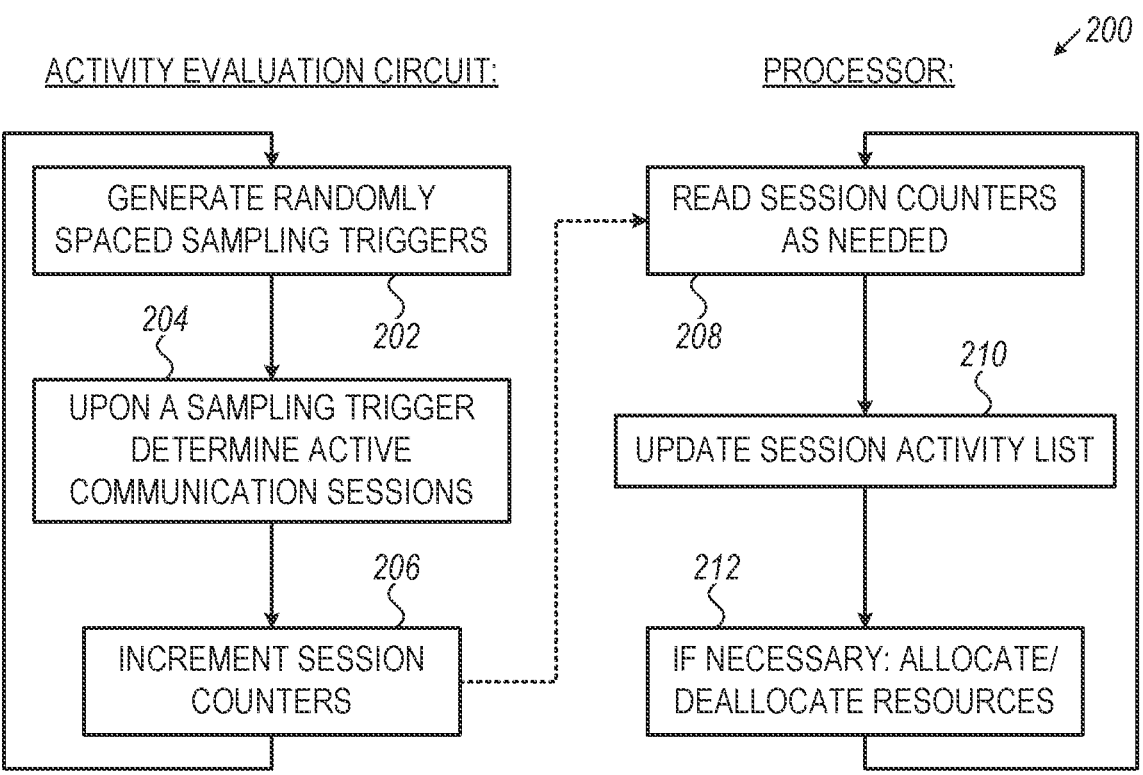
FIG. 2 is a flowchart that schematically illustrates a method for approximate activity counting in a NIC, in accordance with an embodiment of the present invention.

FIG. 2 is a flowchart 200 that schematically illustrates a method for approximate activity counting in a NIC, in accordance with an embodiment of the present invention. The flowchart is executed by respective components of NIC 100 (FIG. 1), including Activity Evaluation Circuit 112, Activity Counters 110, and packet processor 108.

The flowchart starts at a Generating Count Event step 202, wherein Activity Evaluation Circuit 112 generates a next count event in a sequence of randomly spaced count events. In some embodiments the count events may be generated pseudo-randomly, e.g., by an FSR. In other embodiments other mechanisms may be used for the generation of sequence of count events that is independent of the processed packets.

Next, at a Determine Active Sessions step 204, the Activity Evaluation Circuit checks which communication session is active at the time of the count event. In some embodiments, the Activity Evaluation Circuit checks the packets that are communicated over the network through Ports 104 (FIG. 1) and determines the corresponding session or sessions to which the packets belong. In other embodiments, Activity Evaluation Circuit 112 may read a list of currently active sessions from Packet Processor 108.

Next, in an Increment Session Counters step 206, one or more session activity counters 110, corresponding to the currently active sessions, increments (in some embodiments, all counters are periodically decremented, so that counts that correspond to inactive sessions will gradually decrease). After step 206, the NIC reenters step 202, to generate the next count event.

Concurrently to the loop comprising steps 202, 204 and 206, packet processor 108 (FIG. 1) repeatedly receives the activity counts and may reallocate resources of sessions with low activity to sessions with higher activity. In a Read Session Counters step 208, a processor such as Processor 102 (FIG. 1) reads the activity counters as needed. In some embodiments, the processor reads the counters periodically; in other embodiments, the processor may read the counters in response to the NIC detecting traffic congestion, and in yet other embodiments the processor may read the counters in a frequency that is determined respective to a congestion measure that the processor evaluates.

After step 208, processor 102 enters an Update Session Activity List 210, wherein the processor updates an internal list that indicates activity measures for each of the communication sessions. Then, at an Allocate/Deallocate-resources step 210, the processor may change resource allocations, deallocating resources from inactive session and allocating the resources to active sessions. After step 212 the processor reenters step 208, to read an updated version of the activity counters.

As would be appreciated, the flowchart illustrated in FIG. 2 is cited by way of example. Other suitable flowcharts may be used in alternative embodiments. In some embodiments, the processor stores the last activity counts of all sessions; then, in step 208, the processor may subtract the stored read count values from the read count values, to get a temporal activity measure (this may save the need to periodically decrement the session activity counters).

Figure 3:
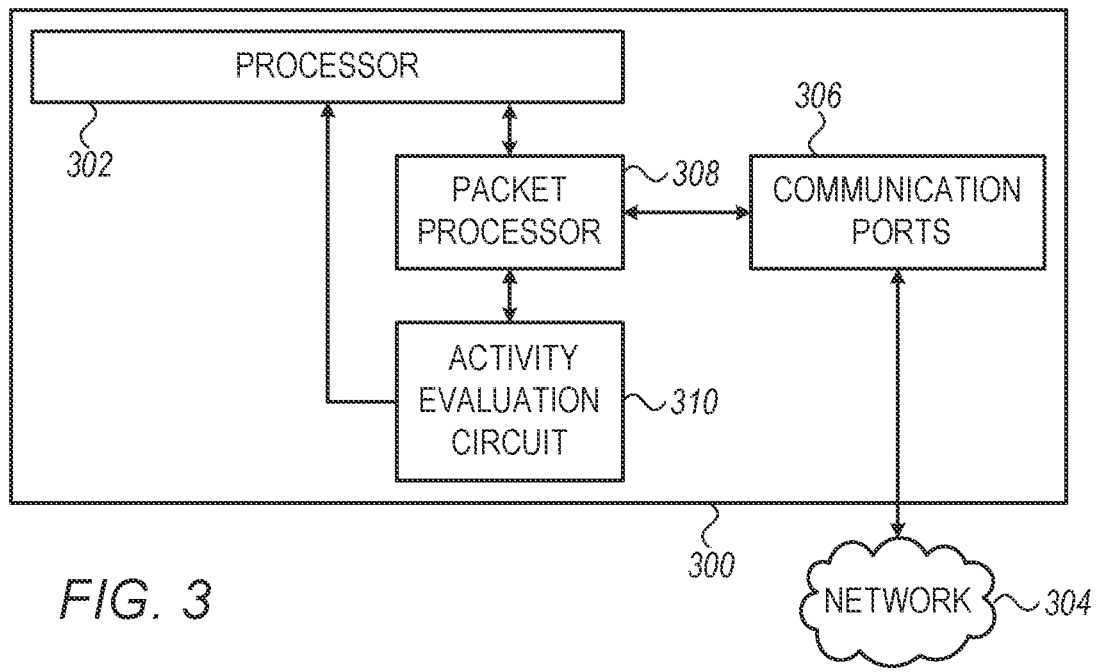
FIG. 3 is a block diagram that schematically illustrates the structure of a NIC employing approximate activity indications, in accordance with an alternative embodiment of the present invention.

In some embodiments, activity counting is done by the processor, in response to approximate activity indications that the activity evaluation counter sends. FIG. 3 is a block diagram that schematically illustrates the structure of a NIC 300 with approximate activity indications, in accordance with an embodiment of the present invention. NIC 300 comprises a processor 302, which is configured to communicate packets over a communication network 304 (e.g., Ethernet or InfiniBand™), in a plurality of communication sessions. The NIC further comprises communication ports 306, which are configured to receive and send communication packets, and a packet processor 308, which is configured to process the packets. In embodiments, processor 302 is configured to allocate and deallocate resources such as memory buffers to the various communication sessions, including the deallocating of resources allocated to communication sessions that are no longer active. (In some embodiments, Similarly to NIC 100 (FIG. 1), the resources that the processor allocates and/or deallocates may be external to the processor, e.g., the resources may be incorporated in the packet processor, or in a separate memory.)

NIC 300 further comprises an Activity Evaluation Circuit 310, which is configured to generate count events at a sequence of evaluation times that is independent of the packet processing. Responsively to the count events, the Activity circuit sends an indication to processor 302; the indication may comprise the ID of a communication session (or a plurality of communication sessions) that are active at the count-event time. The act of sending an indication to processor 302 is regarded herein as another type of "increment event."

Processor 302 may then determine which session or sessions cease to be active and deallocate resources accordingly (the deallocated resources may then be allocated to new sessions, or to active sessions that require additional resources).

In some embodiments, similarly to the example embodiment illustrated in FIG. 1, Activity Evaluation Circuit 310 may be configured to generate the sequence of evaluation times at random time intervals; in embodiments the expectancy and/or the variance of the time intervals are preset parameters; in other embodiments the activity evaluation circuit generates a pseudo-random sequence of evaluation times using, for example, a feedback-shift-register (FSR).

As would be appreciated, the structure of NIC 300, illustrated in FIG. 3 and described hereinabove is cited by way of example. In alternative embodiments various suitable structures may be used. For example, in some embodiments, some or all the resources that processor 302 allocates and/or deallocates are in packet processor 308; in some embodiments, if no packet is being communicated when the activity evaluation circuit generates a count event, the activity evaluation circuit will not send an indication to the processor; in other embodiments, if no packet is being communicated, the activity evaluation circuit will, upon a count event, send an indication pertaining to the last packet that was communicated.

Figure 4:
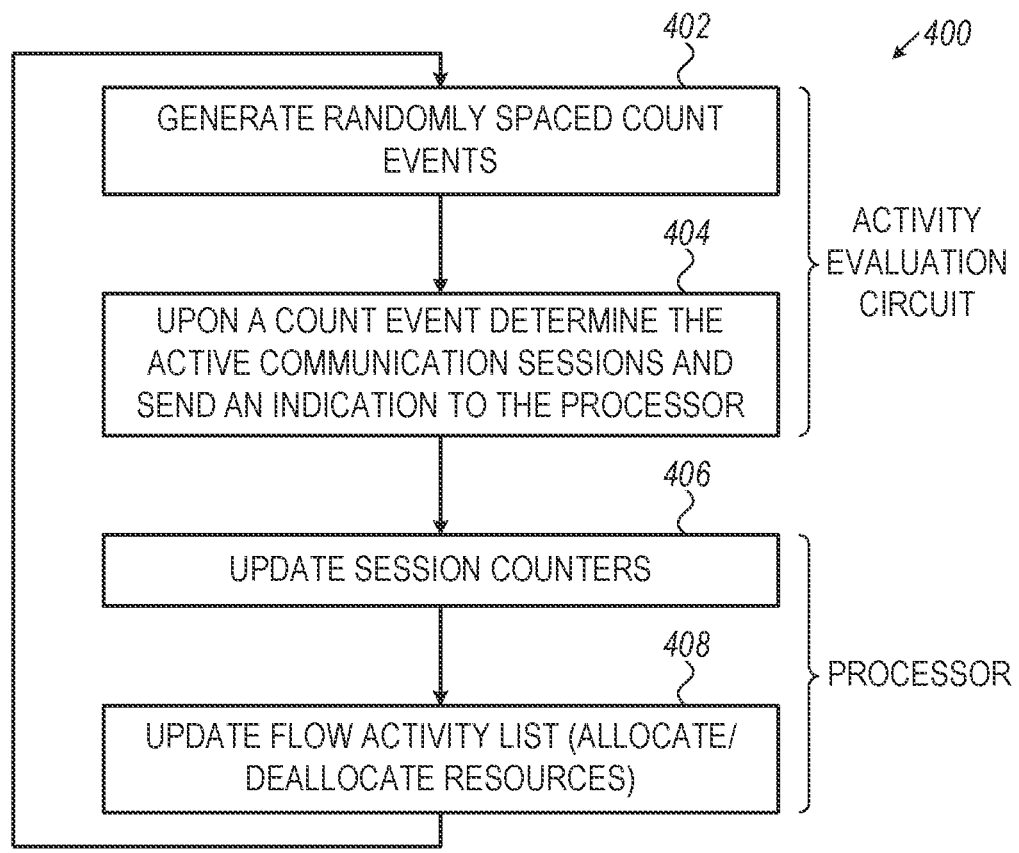
FIG. 4 is a flowchart that schematically illustrates a method for approximate activity indications in a NIC, in accordance with an embodiment of the present invention.

FIG. 4 is a flowchart 400 that schematically illustrates a method for approximate activity indications in a NIC, in accordance with an embodiment of the present invention. The flowchart is executed by Activity Evaluation Circuit 310 and processor 302 (FIG. 3). The flowchart starts at a Generate Count Events step 402, wherein the Activity Evaluation Circuit generates the next count event of a sequence of randomly spaced count events. In some embodiments the count events may be generated pseudo-randomly, e.g., by an FSR. In other embodiments, other mechanisms may be used for the generation of a sequence of count events that is independent of the processed packets. Next, at a Send Indication step 404, the Activity Evaluation Circuit determines which communication sessions are currently active (e.g., by checking the packet that ports 306 currently send or receive) and sends a corresponding indication to processor 302. After step 404, the Activity Evaluation Circuit reenters step 402, to generate the next count event.

According to the example embodiment illustrated in FIG. 4, the processor comprises a set of session counters, which the processor increments or decrements, responsively to activity in a respective session. When, in step 404, the Activity Evaluation Circuit sends an indication to the processor, the processor enters an Update Session Counters step 406 and, responsively to the indication that the processor receives, updates (e.g., increments) the corresponding session counters. Next, in an Update Session Activity list step 408, the processor updates a table that stores and activity measure for each of the sessions, and, if necessary, deallocates resources of inactive sessions.

In embodiments, each of processors 102 (FIG. 1) and 302 (FIG. 3) typically comprises a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Although the disclosures hereinabove mainly address Network Interface Controllers (NICs), the disclosed techniques may also be used in other types of network connected devices, including but not limited to Host Channel Adapters (HCAs), network-enabled graphic processors, switches, gateways, routers and the like.

The configuration of NICs 100 and 300 illustrated and FIGS. 1 and 3, including units and sub-units thereof; and flowcharts 200 and 400, illustrated in FIGS. 2 and 4, are example configurations and flowcharts that are depicted purely for the sake of conceptual clarity. Any other suitable configurations and flowcharts can be used in alternative embodiments. The NIC elements may be implemented using suitable hardware, such as in one or more Application-Specific Integrated Circuit (ASIC) or Field-Programmable Gate Arrays (FPGA), using software, using hardware, or using a combination of hardware and software elements.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A network device, comprising:
   one or more communication ports, to communicate packets over a network;
   a packet processing circuit, to process the packets in multiple sessions using resources allocated respectively to the sessions; and
   an activity evaluation circuit, to:
      generate a sequence of multiple evaluation times independently of the packets;
      for each evaluation time among at least some of the evaluation times in the sequence, for any packet that is processed by the packet processing circuit at the evaluation time, identify a session to which the packet belongs and generate a count event associated with the identified session;
      update respective session activity counters in response to count events associated with the multiple sessions; and
      in response to the count events issued at the sequence of evaluation times, send indications of the sessions that are active at the evaluation times; and
   a processor, to read, in response to the indications sent by the activity evaluation circuit, the respective session activity counters of sessions with low activity levels, and when the session activity counters indicate that a given session is inactive, deallocate the resources of the packet processing circuit from the given session.

2. The network device according to claim 1, wherein the sequence of evaluation times comprises a random sequence.

3. The network device according to claim 1, wherein the activity evaluation circuit is to generate the count event by incrementing a count associated with the identified session.

4. The network device according to claim 1, wherein the activity evaluation circuit is to check for packets during a specified time duration following each evaluation time in the sequence.

5. The network device according to claim 1, wherein the resources allocated to the sessions comprise memory segments.

6. The network device according to claim 1, wherein the activity allocation circuit is to indicate which of the sessions are active, and wherein the packet processing circuit is to reallocate the deallocated resources to one of the active sessions.

7. A method, comprising:
in a network device, processing packets in multiple sessions using resources allocated respectively to the sessions in a packet processing circuit and communicating the packets over a network using one or more communication ports;
generating a sequence of multiple evaluation times independently of the packets;
for each evaluation time in the sequence, for any packet that is processed by the packet processing circuit at the evaluation time, identifying a session to which the packet belongs and generating a count event associated with the identified session;
updating respective session activity counters in response to count events associated with the multiple sessions;
in response to the count events issued at the sequence of evaluation times, sending indications to a processor of the sessions that are active at the evaluation times;
in response to the indications sent by the activity evaluation circuit, reading, by the processor, the respective session activity counters of sessions with low activity levels; and
when the session activity counters indicate that a given session is inactive, deallocating the resources, by the processor, of the packet processing circuit from the given session.

8. The method according to claim 7, wherein generating the sequence of evaluation times comprises generating a random sequence.

9. The method according to claim 7, wherein generating the count event comprises incrementing a count associated with the identified session.

10. The method according to claim 7, wherein generating the sequence of evaluation times comprises checking for packets during a specified time duration following each evaluation time in the sequence.

11. A method for approximate evaluation of session activity levels, the method comprising:
in a network device, transmitting and receiving packets belonging to one or more communication sessions using resources allocated respectively to the sessions;
generating a sequence of multiple evaluation times;
for each evaluation time among at least some of the evaluation times in the sequence, for any packet that is found to be processed at the evaluation time, identifying a session to which the packet belongs and incrementing a count associated with the identified session;
updating respective session activity counters in response to counts associated with the one or more communication sessions;
in response to the counts issued at the sequence of evaluation times, sending indications to a processor of the communication sessions that are active at the evaluation times;
in response to the indications sent by the activity evaluation circuit, reading, by the processor, the respective session activity counters of the communication sessions with low activity levels; and
when the session activity counters indicate that a given session is inactive, deallocating the resources, by the processor, of the packet processing circuit from the given session.

12. The method according to claim 11, wherein the sequence of evaluation times comprises a random sequence.

13. The method according to claim 11, and comprising, for each evaluation time in the sequence, checking for packets during a specified time duration following the evaluation time.

* * * * *